US011060010B2

(12) United States Patent
Chopade et al.

(10) Patent No.: US 11,060,010 B2
(45) Date of Patent: Jul. 13, 2021

(54) EMULSIFIED FLUID SYSTEM FOR FRACTURING APPLICATION

(71) Applicant: Halliburton Energy Services, Inc., Houston, TX (US)

(72) Inventors: Prashant Chopade, Kingwood, TX (US); Rajender Salla, Pune (IN); Monica Rajendra Dandawate, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 231 days.

(21) Appl. No.: 16/090,757

(22) PCT Filed: May 31, 2016

(86) PCT No.: PCT/US2016/035034
§ 371 (c)(1),
(2) Date: Oct. 2, 2018

(87) PCT Pub. No.: WO2017/209734
PCT Pub. Date: Dec. 7, 2017

(65) Prior Publication Data
US 2020/0063014 A1    Feb. 27, 2020

(51) Int. Cl.
*C09K 8/32* (2006.01)
*C09K 8/66* (2006.01)
*C09K 8/80* (2006.01)

(52) U.S. Cl.
CPC ............... *C09K 8/32* (2013.01); *C09K 8/665* (2013.01); *C09K 8/805* (2013.01)

(58) Field of Classification Search
None
See application file for complete search history.

(56) References Cited

U.S. PATENT DOCUMENTS

| 9,038,717 | B2 | 5/2015 | Vo et al. | |
|---|---|---|---|---|
| 2004/0147404 | A1* | 7/2004 | Thaemlitz | C09K 8/26 507/100 |
| 2005/0049147 | A1* | 3/2005 | Patel | C09K 8/36 507/103 |

(Continued)

FOREIGN PATENT DOCUMENTS

| WO | 2015016911 | 7/2013 |
|---|---|---|
| WO | 2014137904 | 9/2014 |

(Continued)

OTHER PUBLICATIONS

International Search Report and Written Opinion for PCT/US2016/035034 dated Feb. 27, 2017.

*Primary Examiner* — John J Figueroa
(74) *Attorney, Agent, or Firm* — Thomas Rooney; C. Tumey Law Group PLLC

(57) ABSTRACT

A method of treating in a subterranean formation including combining a dimer acid; proppant; an emulsifier; an oil base fluid; and aqueous base fluid to form an oil-external emulsified fluid; and introducing the oil-external emulsified fluid into the subterranean formation. A method of forming a wellbore fluid including combining proppant; a dimer acid; an aqueous base fluid, an oil base fluid, and an emulsifier to form a pre-emulsified fluid; and mixing the pre-emulsified fluid to form an oil-external emulsified fluid.

21 Claims, 4 Drawing Sheets

(56) References Cited

U.S. PATENT DOCUMENTS

| | | | |
|---|---|---|---|
| 2006/0079407 A1* | 4/2006 | Thaemlitz | C09K 8/26 |
| | | | 507/131 |
| 2011/0030949 A1 | 2/2011 | Weaver et al. | |
| 2014/0367100 A1 | 12/2014 | Oliveira et al. | |
| 2015/0152313 A1* | 6/2015 | Picco | C09K 8/82 |
| | | | 166/305.1 |
| 2016/0145487 A1* | 5/2016 | Alam | C09K 8/74 |
| | | | 507/209 |
| 2016/0340575 A1* | 11/2016 | Nguyen | E21B 43/26 |

FOREIGN PATENT DOCUMENTS

| | | |
|---|---|---|
| WO | 2015020664 | 2/2015 |
| WO | 2015038117 | 3/2015 |

* cited by examiner

EMULSIFIED FLUID SYSTEM FOR FRACTURING APPLICATION

BACKGROUND

The present invention generally relates to the use of proppants in subterranean operations, and, more specifically, to oil-external emulsified fluid systems, and methods of using these emulsified fluid systems in subterranean operations.

Subterranean wells (e.g., hydrocarbon fluid producing wells and water producing wells) are often stimulated by hydraulic fracturing treatments. In a typical hydraulic fracturing treatment, a treatment fluid is pumped into a wellbore in a subterranean formation at a rate and pressure above the fracture gradient of the particular subterranean formation so as to create or enhance at least one fracture therein. Particulate solids (e.g., graded sand, bauxite, ceramic, nut hulls, and the like), or "proppant particulates," are typically suspended in the treatment fluid or a second treatment fluid and deposited into the fractures while maintaining pressure above the fracture gradient. The proppant particulates are generally deposited in the fracture in a concentration sufficient to form a tight pack of proppant particulates, or "proppant pack," which serves to prevent the fracture from fully closing once the hydraulic pressure is removed. By keeping the fracture from fully closing, the interstitial spaces between individual proppant particulates in the proppant pack form conductive pathways through which produced fluids may flow.

In traditional hydraulic fracturing treatments, the specific gravity of the proppant particulates may be high in relation to the treatment fluids in which they are suspended for transport and deposit in a target interval (e.g., a fracture). Therefore, the proppant particulates may settle out of the treatment fluid and fail to reach the target interval. For example, where the proppant particulates are to be deposited into a fracture, the proppant particulates may settle out of the treatment fluid and accumulate only or substantially at the bottommost portion of the fracture, which may result in complete or partial occlusion of the portion of the fracture where no proppant particulates have collected (e.g., at the top of the fracture). As such, fracture conductivity and production over the life of a subterranean well may be substantially impaired if proppant particulates settle out of the treatment fluid before reaching their target interval within a subterranean formation.

One way to compensate for proppant particulate settling is to introduce the proppant particulates into the fracture in a viscous gelled fluid. Gelled fluids typically require high concentrations of gelling agents and/or crosslinker, particularly when transporting high concentrations of proppant particulates in order to maintain them in suspension. As many gelling and crosslinking agents are used in a variety of fluids within and outside of the oil and gas industry, their demand is increasing while their supply is decreasing. Therefore, the cost of gelling and crosslinking agents is increasing, and consequently, the cost of hydraulic fracturing treatments requiring them is also increasing. Additionally, the use of gelling and crosslinking agents may result in premature viscosity increases that may cause pumpability issues or problems with subterranean operations equipment.

Prior attempts aimed at preventing proppant settling in a vertical fracture have focused on creating proppant with density less than or equal to that of the carrier fluid. The methods of creating neutrally buoyant proppant includes surface-sealing of porous ceramic particles to trap air-filled voids inside the particles, creating composites of strong materials and hollow ceramic spheres, and creating hollow spheres with sufficient wall strength to withstand closure stresses. Polymer composite has also been used to make lightweight proppant. These approaches have characteristic drawbacks in terms of proppant durability and cost to manufacture.

The degree of success of a hydraulic fracturing operation depends, at least in part, upon fracture conductivity after the fracturing operation has ceased and production commenced, creating the need for products and methods that hinder the settling of proppant particulates in a treatment fluid.

BRIEF DESCRIPTION OF THE DRAWINGS

The following figures are included to illustrate certain aspects of the present invention, and should not be viewed as exclusive embodiments. The subject matter disclosed is capable of considerable modification, alteration, and equivalents in form and function, as will occur to one having ordinary skill in the art and having the benefit of this disclosure.

DETAILED DESCRIPTION

Figures 1A, 1B, 1C:
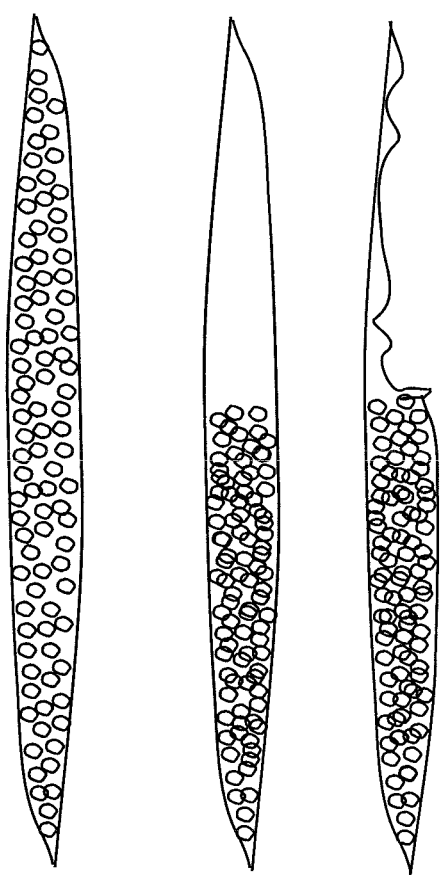
FIGS. 1A-C depict the problems with proppant suspension stages in vertical fractures.

Embodiments of the invention are directed to oil-external emulsion fluid systems including a dimer acid, an aqueous base fluid and an oil base fluid used in providing a method for improved vertical proppant suspension that may lead to improved conductivity and an increase in hydrocarbon production. Proppant transport inside a hydraulic fracture has two components when the fracture is being generated. The horizontal component is dictated by the fluid velocity and associated streamlines which help carry proppant to the tip of the fracture. The vertical component is governed by the particle settling velocity of the proppant and is a function of proppant diameter and density as well as fluid viscosity and density. FIGS. 1A-C demonstrate the various proppant suspension stages in vertical fracture. FIG. 1A depicts the fracture after the completion of pumping proppant slurry. FIG. 1B shows the vertical distribution of the proppants during shut-in time, followed by FIG. 1C, the structure after fracture closure.

In certain embodiments of the present invention, a method of treating in a subterranean formation comprises: combining a dimer acid; proppant; an emulsifier; an oil base fluid; and aqueous base fluid to form an oil-external emulsified fluid; and introducing the oil-external emulsified fluid into the subterranean formation. The oil-external emulsified fluid may be introduced into the formation near-wellbore. The aqueous base fluid may comprise at least one fluid selected from fresh water; saltwater; brine; seawater; and combinations thereof. The dimer acid may comprise fatty acids with 6 to 18 carbon atoms. The fatty acids may be the same type of fatty acid, or may be a mixture of two or more different fatty acids. In some embodiments, the oil-external fluids do not contain a trimer acid. The oil base fluid may comprise at least at least one of esters prepared from fatty acids and alcohols; esters prepared from olefins and fatty acids; esters prepared from olefins and alcohols; linear alpha olefins; isomerized olefins having a straight chain; olefins having a branched structure; isomerized olefins having a cyclic structure; olefin hydrocarbons; linear paraffins; branched paraffins; poly-branched paraffins; cyclic paraffins; isoparaffins; mineral oil hydrocarbons; glyceride triesters; naphthenic compounds; diesel; aliphatic ethers prepared from long chain alcohols; aliphatic acetals; dialkylcarbonates; and combinations thereof. The proppants may be at least one selected from the group consisting of sand; bauxite; ceramic materials; glass materials; polymer materials; nut shell pieces; cured resinous particulates comprising nut shell pieces; seed shell pieces; cured resinous particulates comprising seed shell pieces; fruit pit pieces; cured resinous particulates comprising fruit pit pieces; wood; composite particulates; hydrophobically modified proppants, inherently hydrophobic proppants, proppants with a hydrophobic coating; and any combination thereof. In other embodiments, the subterranean formation comprises at least one fracture and wherein the introducing further comprises placing at least a portion of the oil-external fluid into the at least one fracture. The method may further comprise breaking the introduced emulsion without the use of an internal breaker. The oil-external emulsified fluid may have an oil-to-water ratio of about 1:99 to about 35:65. The dimer acid may be present in the amount of about 1 gal/1000 gal to about 100 gal/1000 gal of the oil-external emulsified fluid.

Some embodiments of the present invention provide a method of treating in a subterranean formation comprising: combining proppant; a dimer acid; an aqueous base fluid, an oil base fluid, and an emulsifier to form a pre-emulsified fluid; and mixing the pre-emulsified fluid to form an oil-external emulsified fluid. The proppant may be coated with the dimer acid to form a coated proppant before combining the resulting coated proppant with the aqueous base fluid, the oil base fluid, and the emulsifier. The aqueous base fluid may comprise at least one fluid selected from fresh water; saltwater; brine; seawater; and combinations thereof. The dimer acid may comprise fatty acids with 6 to 18 carbon atoms. The fatty acids may be the same type of fatty acid, or may be a mixture of two or more different fatty acids. In some embodiments, the oil-external fluids do not contain a trimer acid. The oil base fluid may comprise at least at least one of esters prepared from fatty acids and alcohols; esters prepared from olefins and fatty acids; esters prepared from olefins and alcohols; linear alpha olefins; isomerized olefins having a straight chain; olefins having a branched structure; isomerized olefins having a cyclic structure; olefin hydrocarbons; linear paraffins; branched paraffins; poly-branched paraffins; cyclic paraffins; isoparaffins; mineral oil hydrocarbons; glyceride triesters; naphthenic compounds; diesel; aliphatic ethers prepared from long chain alcohols; aliphatic acetals; dialkylcarbonates; and combinations thereof. The proppants may be at least one selected from the group consisting of sand; bauxite; ceramic materials; glass materials; polymer materials; nut shell pieces; cured resinous particulates comprising nut shell pieces; seed shell pieces; cured resinous particulates comprising seed shell pieces; fruit pit pieces; cured resinous particulates comprising fruit pit pieces; wood; composite particulates; hydrophobically modified proppants, inherently hydrophobic proppants, proppants with a hydrophobic coating; and any combination thereof. The oil-external emulsified fluid may have an oil-to-water ratio of about 1:99 to about 35:65. The dimer acid may be present in the amount of about 1 gal/1000 gal to about 100 gal/1000 gal of the oil-external emulsified fluid.

In an embodiment, a well treatment fluid comprises: an oil-external emulsified fluid comprising: a dimer acid; proppant; an emulsifier; an oil base fluid; and an aqueous base fluid. The proppant may be coated with the dimer acid to form a coated proppant before combining the resulting coated proppant with the aqueous base fluid, the oil base fluid, and the emulsifier. The aqueous base fluid may comprise at least one fluid selected from fresh water; saltwater; brine; seawater; and combinations thereof. The dimer acid may comprise fatty acids with 6 to 18 carbon atoms. The fatty acids may be the same type of fatty acid, or may be a mixture of two or more different fatty acids. In some embodiments, the oil-external fluids do not contain a trimer acid. The oil base fluid may comprise at least at least one of esters prepared from fatty acids and alcohols; esters prepared from olefins and fatty acids; esters prepared from olefins and alcohols; linear alpha olefins; isomerized olefins having a straight chain; olefins having a branched structure; isomerized olefins having a cyclic structure; olefin hydrocarbons; linear paraffins; branched paraffins; poly-branched paraffins; cyclic paraffins; isoparaffins; mineral oil hydrocarbons; glyceride triesters; naphthenic compounds; diesel; aliphatic ethers prepared from long chain alcohols; aliphatic acetals; dialkylcarbonates; and combinations thereof. The proppants may be at least one selected from the group consisting of sand; bauxite; ceramic materials; glass materials; polymer materials; nut shell pieces; cured resinous particulates comprising nut shell pieces; seed shell pieces; cured resinous particulates comprising seed shell pieces; fruit pit pieces; cured resinous particulates comprising fruit pit pieces; wood; composite particulates; hydrophobically modified proppants, inherently hydrophobic proppants, proppants with a hydrophobic coating; and any combination thereof. The oil-external emulsified fluid may have an oil-to-water ratio of about 1:99 to about 35:65. The dimer acid may be present in the amount of about 1 gal/1000 gal to about 100 gal/1000 gal of the oil-external emulsified fluid.

In an exemplary embodiment, a well treatment system comprises: a well treatment apparatus, including a mixer and a pump, configured to: combine proppant; a dimer acid; an aqueous base fluid, an oil base fluid, and an emulsifier to form a pre-emulsified fluid; mix the pre-emulsified fluid to form an oil-external emulsified fluid; and introduce the oil-external emulsified fluid into a subterranean formation. The proppant may coated with the dimer acid to form a coated proppant before combining the resulting coated proppant with the aqueous base fluid, the oil base fluid, and the emulsifier. The oil-external emulsified fluid may have an oil-to-water ratio of about 1:99 to about 35:65. The dimer acid may be present in the amount of about 1 gal/1000 gal to about 100 gal/1000 gal of the oil-external emulsified fluid.

The methods and fluids described herein may result in improved proppant suspension compared to conventional systems by utilizing a low cost emulsified fluid system.

General Measurement Terms

Unless otherwise specified or unless the context otherwise clearly requires, any ratio or percentage means by volume.

If there is any difference between U.S. or Imperial units, U.S. units are intended.

Unless otherwise specified, mesh sizes are in U.S. Standard Mesh.

The micrometer (μm) may sometimes be referred to herein as a micron.

The conversion between pound per gallon (lb/gal or ppg) and kilogram per cubic meter (kg/m³) is: 1 lb/gal=(1 lb/gal)× (0.4536 kg/lb)×(gal/0.003785 m³)=120 kg/m³.

Wellbore treatment fluids according to this disclosure comprise an aqueous phase comprising an aqueous base fluid and an oil phase (oil base fluid) comprising an oleaginous fluid or hydrocarbon. In embodiments, the wellbore treatment fluid is water-based, and comprises an aqueous base fluid. In embodiments, the wellbore treatment fluid of this disclosure is an oil-external emulsion comprising an oil-external phase and an aqueous internal phase.

Aqueous Base Fluid

As used herein, the term 'aqueous fluid' refers to a material comprising water or a water-miscible but oleaginous fluid-immiscible compound. Illustrative aqueous fluids suitable for use in embodiments of this disclosure include, for example, fresh water, sea water, a brine containing at least one dissolved organic or inorganic salt, a liquid containing water-miscible organic compounds, and the like.

The aqueous fluid or base fluid of the present embodiments can generally be from any source, provided that the fluids do not contain components that might adversely affect the stability and/or performance of the wellbore treatment fluids of the present disclosure. In various embodiments, the aqueous fluid can comprise fresh water, salt water, seawater, brine, or an aqueous salt solution. In some embodiments, the aqueous fluid can comprise a monovalent brine or a divalent brine. Suitable monovalent brines can include, for example, sodium chloride brines, sodium bromide brines, potassium chloride brines, potassium bromide brines, and the like. Suitable divalent brines can include, for example, magnesium chloride brines, calcium chloride brines, calcium bromide brines, and the like. In some embodiments, the aqueous base fluid can be a high density brine. As used herein, the term 'high density brine' refers to a brine that has a density of about 9.5-10 lbs/gal or greater (1.1 g/cm³-1.2 g/cm³ or greater).

Oil Base Fluid

A wellbore treatment fluid of this disclosure comprises an oil phase. In embodiments, a wellbore treatment fluid according to this disclosure comprises an oil-external phase. The oil phase comprises an oleaginous fluid, which may include one or more hydrocarbon. As used herein, the term 'oleaginous fluid' refers to a material having the properties of an oil or like non-polar hydrophobic compound. Illustrative oleaginous fluids suitable for use in embodiments of this disclosure include, for example, (i) esters prepared from fatty acids and alcohols, or esters prepared from olefins and fatty acids or alcohols; (ii) linear alpha olefins, isomerized olefins having a straight chain, olefins having a branched structure, isomerized olefins having a cyclic structure, and olefin hydrocarbons; (iii) linear paraffins, branched paraffins, poly-branched paraffins, cyclic paraffins and isoparaffins; (iv) mineral oil hydrocarbons; (v) glyceride triesters including, for example, rapeseed oil, olive oil, canola oil, castor oil, coconut oil, corn oil, cottonseed oil, lard oil, linseed oil, neatsfoot oil, palm oil, peanut oil, *perilla* oil, rice bran oil, safflower oil, sardine oil, sesame oil, soybean oil and sunflower oil; (vi) naphthenic compounds (cyclic paraffin compounds having a formula of $C_nH_{2n}$ where n is an integer ranging between about 5 and about 30); (vii) diesel; (viii) aliphatic ethers prepared from long chain alcohols; and (ix) aliphatic acetals, dialkylcarbonates, and mixtures thereof. As used herein, fatty acids and alcohols or long chain acids and alcohols refer to acids and alcohols containing about 6 to about 22 carbon atoms, or about 6 to about 18 carbon atoms, or about 6 to about 14 carbon atoms. In some embodiments, such fatty acids and alcohols have about 6 to about 22 carbon atoms comprising their main chain. One of ordinary skill in the art will recognize that the fatty acids and alcohols may also contain unsaturated linkages.

In embodiments, in a wellbore treatment fluid according to this disclosure, an oleaginous fluid external phase and an aqueous fluid internal phase are present in a ratio of less than about 50:50. This ratio is commonly stated as the oil-to-water ratio (OWR). That is, in the present embodiments, a wellbore treatment fluid having a 50:50 OWR comprises 50% oleaginous fluid external phase and 50% aqueous fluid internal phase. In embodiments, treatment fluid according to this disclosure have an OWR ranging between about 1:99 to about 35:65, including all sub-ranges therein between. In embodiments, treatment fluid of this disclosure have an OWR ranging between about 1:99 and about 10:90, including all sub-ranges therein between. In embodiments, the treatment fluids have an OWR of about 10:90 or less. In embodiments, the treatment fluids have an OWR of about 5:95 or less. One of ordinary skill in the art will recognize that lower OWRs can more readily form emulsions that are suitable for suspending sand and other proppants therein. However, one of ordinary skill in the art will also recognize that an OWR that is too low may prove overly viscous for downhole pumping.

In embodiments, an oil-external emulsion treatment fluid according to this disclosure comprises a less than conventional volume percentage of oil. For example, in embodiments, a wellbore treatment fluid according to this disclosure comprises from about 1 to about 10, from about 2 to about 9, or from about 3 to about 8 volume percent oil, based on the total volume of the treatment fluid. In embodiments, a wellbore treatment fluid according to this disclosure comprises less than or equal to about 30, 25, 20, 15, 10, 9, 8 7, 6, 5, 4, or 3 volume percent oil, based on the total volume of the treatment fluid.

Dimer Acids

Dimer acids are dicarboxylic acids and are also known as dimerized fatty acids. Dimer acids may be prepared by dimerizing unsaturated fatty acids. The unsaturated fatty acids can have, for example, from 6 to about 22 carbon atoms. Preferably, the fatty acids of the dimer acid have from 6 to 18 carbon atoms. The fatty acids of the dimerized fatty acid can be the same or a mixture of two or more different fatty acids.

A common dimer acid is obtained from tall oil, which can be dimerzied, for example, on clay catalysts. The CAS number of this particular dimer acid material is [61788-89-4]. This dimer acid usually contains predominantly a dimer of stearic acid. It is also called C36 dimer acid. This dimer acid is a light yellow or yellow viscous transparent liquid.

Dimer acid compositions may contain trimer acids and monomer acids. For purposes of this disclosure, the dimer acids should contain at least about 75% dimer acid.

Dimer acids of the disclosure may be present in the amount of about 1 gal/1000 gal to about 100 gal/1000 gal. A preferred range is about 5 gal/1000 gal to about 30 gal/1000 gal.

Proppants

One component of the oil-external emulsions of the disclosure include proppants. In some embodiments, the proppants may be an inert material, and may be sized (e.g., a suitable particle size distribution) based upon the characteristics of the void space to be placed in.

Materials suitable for proppant particulates may comprise any material comprising inorganic or plant-based materials suitable for use in subterranean operations. Suitable materials include, but are not limited to, sand; bauxite; ceramic materials; glass materials; nut shell pieces; cured resinous particulates comprising nut shell pieces; seed shell pieces; cured resinous particulates comprising seed shell pieces; fruit pit pieces; cured resinous particulates comprising fruit pit pieces, wood; hydrophobically modified proppant, inherently hydrophobic proppant, proppant with a hydrophobic coating, and combinations thereof. The mean proppant particulate size generally may range from about 2 mesh to about 400 mesh on the U.S. Sieve Series; however, in certain circumstances, other mean proppant particulate sizes may be desired and will be entirely suitable for practice of the embodiments disclosed herein. In particular embodiments, preferred mean proppant particulate size distribution ranges are one or more of 6/12, 8/16, 12/20, 16/30, 20/40, 30/50, 40/60, 40/70, or 50/70 mesh. It should be understood that the term "particulate," as used herein, includes all known shapes of materials, including substantially spherical materials; fibrous materials; polygonal materials (such as cubic materials); and any combination thereof. In certain embodiments, the particulates may be present in the treatment fluids in an amount in the range of from an upper limit of about 30 pounds per gallon ("ppg")(3600 kg/m$^3$), 25 ppg (3000 kg/m$^3$), 20 ppg (2400 kg/m$^3$), 15 ppg (1800 kg/m$^3$), and 10 ppg (1200 kg/m$^3$) to a lower limit of about 0.5 ppg (60 kg/m$^3$), 1 ppg (120 kg/m$^3$), 2 ppg (240 kg/m$^3$), 4 ppg (480 kg/m$^3$), 6 ppg (720 kg/m$^3$), 8 ppg (960 kg/m$^3$), and 10 ppg (1200 kg/m$^3$) by volume of the treatment fluids.

Coated Proppants

As used herein, the term "coating," and the like, does not imply any particular degree of coating on a particulate. In particular, the terms "coat" or "coating" do not imply 100% coverage by the coating on a particulate. It should be understood that the term "particulate," as used in this disclosure, includes all known shapes of materials, including substantially spherical materials, fibrous materials, polygonal materials (such as cubic materials), and combinations thereof.

The proppant coating may be applied by many techniques. In one embodiment, the polymer is applied by solution coating. In this process a polymer solution is prepared by mixing polymer into a solvent until a homogenous mixture is achieved. Proppant is added to solution, and the solvent is removed under vacuum using a rotary evaporator. The remaining proppant is adsorbed to proppant surface.

In an embodiment, a spray coating technique is used. Liquid polymer (or polymer solution) is sprayed onto the proppant substrate. The coated proppant is then dried to remove water or carrier fluids.

In various embodiments, the amount of coating on the proppants is about 0.1 wt. % to about 10 wt. % of the proppant substrate. In another embodiment, the amount of coating is the amount needed to produce a hydrophobic proppant particle.

Emulsifiers

A wellbore treatment fluid according to this disclosure may comprise one or more emulsifiers. Examples of suitable emulsifiers may include, but are not limited to, surfactants, proteins, hydrolyzed proteins, lipids, glycolipids, nanosized particulates (e.g., fumed silica), and combinations thereof. The emulsifier may be a polyaminated fatty acid.

The emulsifiers of the disclosure may be present in the amount of about 1 gal/1000 gal to about 50 gal/1000 gal.

Consolidating Agents

The consolidating agents used in the compositions and methods of the present invention generally comprise any compound that is capable of minimizing particulate migration and/or modifying the stress-activated reactivity of subterranean fracture faces and other surfaces in subterranean formations. The consolidating agent may comprise compounds such as tackifying agents, resins, and combinations thereof. The consolidating agents may be present in the oil-external emulsion in an amount in the range from about 0.01% to 30% by weight of the composition. The type and amount of consolidating agent included in a particular composition or method of the invention may depend upon, among other factors, the temperature of the subterranean formation, the chemical composition of formations fluids, flow rate of fluids present in the formation, and the like. It is within the ability of one skilled in the art, with the benefit of this disclosure, to determine the type and amount of consolidating agent to include in the oil-external emulsion fluids of the present invention to achieve the desired results.

In some embodiments, the consolidating agent may comprise a tackifying agent. A particularly preferred group of tackifying agents comprises polyamides that are liquids or in solution at the temperature of the subterranean formation such that they are, by themselves, non-hardening when introduced into the subterranean formation. A particularly preferred product is a condensation reaction product comprised of commercially available polyacids and a polyamine. Such commercial products include compounds such as mixtures of $C_{36}$ dibasic acids containing some trimer and higher oligomers and also small amounts of monomer acids that are reacted with polyamines. Other polyacids include trimer acids, synthetic acids produced from fatty acids, maleic anhydride, acrylic acid, and the like. Such acid compounds are commercially available from companies such as Witco Corporation, Union Camp, Chemtall, and Emery Industries. The reaction products are available from, for example, Champion Technologies, Inc. and Witco Corporation. Additional compounds which may be used as tackifying agents include liquids and solutions of, for example, polyesters, polycarbonates and polycarbamates, natural resins such as shellac and the like.

Other Additives

In addition to the foregoing materials, it can also be desirable, in some embodiments, for other components to be present in the treatment fluid. Such additional components can include, without limitation, surfactants, gelling agents, fluid loss control agents, corrosion inhibitors, rheology control modifiers or thinners, viscosity enhancers, temporary viscosifying agents, filtration control additives, high temperature/high pressure control additives, emulsification additives, surfactants, acids, alkalinity agents, pH buffers, fluorides, gases, nitrogen, carbon dioxide, surface modifying agents, tackifying agents, foamers, scale inhibitors, catalysts, clay control agents, biocides, bactericides, friction reducers, antifoam agents, bridging agents, dispersants, flocculants, $H_2S$ scavengers, $CO_2$ scavengers, oxygen scavengers, friction reducers, breakers, relative permeability modifiers, resins, wetting agents, coating enhancement agents, filter cake removal agents, surfactants, defoamers, shale stabilizers, oils, and the like. One or more of these additives (e.g., bridging agents) may comprise degradable materials that are capable of undergoing irreversible degradation downhole. A person skilled in the art, with the benefit of this disclosure, will recognize the types of additives that may be included in the fluids of the present disclosure for a particular application, without undue experimentation.

Methods of Use

A method of treating a fracture in a subterranean formation may include combining a dimer acid; proppant; an emulsifier; an oil base fluid; and aqueous base fluid to form an oil-external emulsified fluid; and pumping the emulsion fluid into the subterranean formation. Further, the emulsion may be broken without the use of an internal breaker. The breaking may occur within about 1 hour of placing the fluid in the wellbore. The breaking time may also occur within about 2, 3, 4, 5, 6, 7, 8, 9, 10, 11, 12, 13, 14, 15, 26, 17, 18, 19, 20, 21, 22 23, or 24 hours of placing the fluid in the wellbore.

Another method of treating a fracture in a subterranean formation includes combining proppant; a dimer acid; an aqueous base fluid, an oil base fluid, and an emulsifier to form a pre-emulsified fluid; mixing the pre-emulsified fluid, and pumping the emulsified fluid into the subterranean formation. The proppant may be coated with the dimer acid to form a coated proppant before mixing the coated proppant with the aqueous base fluid, the oil base fluid, and the emulsifier.

The treatment fluids of the present invention may be prepared by any method suitable for a given application. For example, certain components of the treatment fluid of the present invention may be provided in a pre-blended powder or a dispersion of powder in a nonaqueous liquid, which may be combined with the aqueous base fluid at a subsequent time. After the preblended liquids and the aqueous base fluid have been combined polymerization initiators and other suitable additives may be added prior to introduction into the wellbore. Those of ordinary skill in the art, with the benefit of this disclosure will be able to determine other suitable methods for the preparation of the treatments fluids of the present invention.

The methods of the present invention may be employed in any subterranean treatment where a viscoelastic treatment fluid may be used. Suitable subterranean treatments may include, but are not limited to, fracturing treatments, sand control treatments (e.g., gravel packing), and other suitable treatments where a treatment fluid of the present invention may be suitable.

The methods and fluids of the present application may also be used in drilling applications. This fluids may assist in carrying drill cuttings to the surface.

In addition to the fracturing fluid, other fluids used in servicing a wellbore may also be lost to the subterranean formation while circulating the fluids in the wellbore. In particular, the fluids may enter the subterranean formation via lost circulation zones for example, depleted zones, zones of relatively low pressure, zones having naturally occurring fractures, weak zones having fracture gradients exceeded by the hydrostatic pressure of the drilling fluid, and so forth.

Wellbore and Formation

Broadly, a zone refers to an interval of rock along a wellbore that is differentiated from surrounding rocks based on hydrocarbon content or other features, such as perforations or other fluid communication with the wellbore, faults, or fractures. A treatment usually involves introducing a treatment fluid into a well. As used herein, a treatment fluid is a fluid used in a treatment. Unless the context otherwise requires, the word treatment in the term "treatment fluid" does not necessarily imply any particular treatment or action by the fluid. If a treatment fluid is to be used in a relatively small volume, for example less than about 200 barrels, it is sometimes referred to in the art as a slug or pill. As used herein, a treatment zone refers to an interval of rock along a wellbore into which a treatment fluid is directed to flow from the wellbore. Further, as used herein, into a treatment zone means into and through the wellhead and, additionally, through the wellbore and into the treatment zone.

As used herein, into a subterranean formation can include introducing at least into and/or through a wellbore in the subterranean formation. According to various techniques known in the art, equipment, tools, or well fluids can be directed from a wellhead into any desired portion of the wellbore. Additionally, a well fluid can be directed from a portion of the wellbore into the rock matrix of a zone.

In various embodiments, systems configured for delivering the treatment fluids described herein to a downhole location are described. In various embodiments, the systems can comprise a pump fluidly coupled to a tubular, the tubular containing the treatment fluids disclosed herein.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluid to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluid to the high pressure pump. In such embodiments, the low pressure pump may "step up" the pressure of the treatment fluid before it reaches the high pressure pump.

In embodiments, the disclosed wellbore treatment fluid may be prepared at a well site or at an offsite location. Once prepared, a treatment fluid of the present disclosure may be placed in a tank, bin, or other container for storage and/or transport to the site where it is to be used. In other embodiments, a treatment fluid of the present disclosure may be prepared on-site, for example, using continuous mixing, on-the-fly mixing, or real-time mixing methods. In certain embodiments, these methods of mixing may include methods of combining two or more components wherein a flowing stream of one element is continuously introduced into flowing stream of another component so that the streams are combined and mixed while continuing to flow as a single stream as part of the on-going treatment. The system depicted in FIG. 2 (described further below) may be one embodiment of a system and equipment used to accomplish on-the-fly or real-time mixing.

In some embodiments, the systems described herein can further comprise a mixing tank that is upstream of the pump and in which the treatment fluid is formulated. In various embodiments, the pump (e.g., a low pressure pump, a high pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

Figure 2:
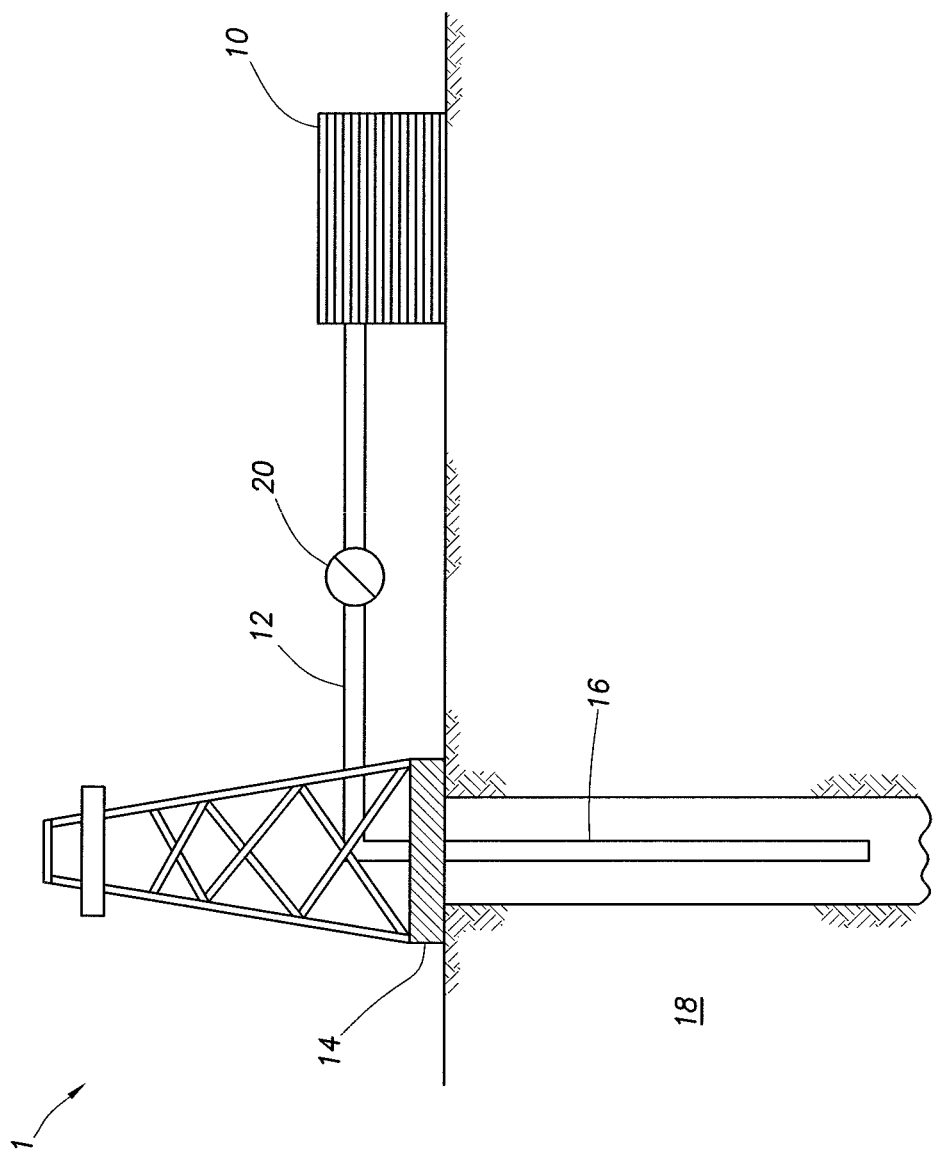
FIG. 2 depicts an embodiment of a system configured for delivering the emulsion fluids of the embodiments described herein to a downhole location.

FIG. 2 shows an illustrative schematic of a system that can deliver treatment fluids of the embodiments disclosed herein to a downhole location, according to one or more embodiments. It should be noted that while FIG. 2 generally depicts a land-based system, it is to be recognized that like systems may be operated in subsea locations as well. As depicted in FIG. 2, system 1 may include mixing tank 10, in which a treatment fluid of the embodiments disclosed herein may be formulated. The treatment fluid may be conveyed via line 12 to wellhead 14, where the treatment fluid enters tubular 16, tubular 16 extending from wellhead 14 into subterranean formation 18. Upon being ejected from tubular 16, the treatment fluid may subsequently penetrate into subterranean formation 18. Pump 20 may be configured to raise the pressure of the treatment fluid to a desired degree before its introduction into tubular 16. It is to be recognized that system 1 is merely exemplary in nature and various additional components may be present that have not necessarily been depicted in FIG. 2 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 2, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 2.

The invention having been generally described, the following examples are given as particular embodiments of the invention and to demonstrate the practice and advantages hereof. It is understood that the examples are given by way of illustration and are not intended to limit the specification or the claims to follow in any manner.

EXAMPLES

Emulsion Formation and Stability
Compositions:

SANDWEDGE NT™ conductivity enhancer is a system containing dipropylene glycol monomethyl ether and heavy aromatic petroleum naphtha, and is available from Halliburton Energy Services, Inc., Houston, Tex.

UNIFRAC™ 20/40 hydraulic fracturing sand has a size in the range of from 20 mesh to 40 mesh available from Unimin Corporation-Energy Division, Woodlands, Tex.

Dimer Acid-RS T 80™ additive contains 72-82% dimer acid, 17-20% trimer acid, and a maximum of 5% monomer acid, and is available from Riteks, McKinney, Tex.

ESCAID 110™ oil is a light hydrotreated petroleum distillate/mineral oil, available from ExxonMobil Chemical Company, Spring, Tex.

EZ MUL NT™ emulsifier is a polyaminated fatty acid available from Halliburton Energy Services, Houston, Tex.

Experimental Procedure

Figure 3A:
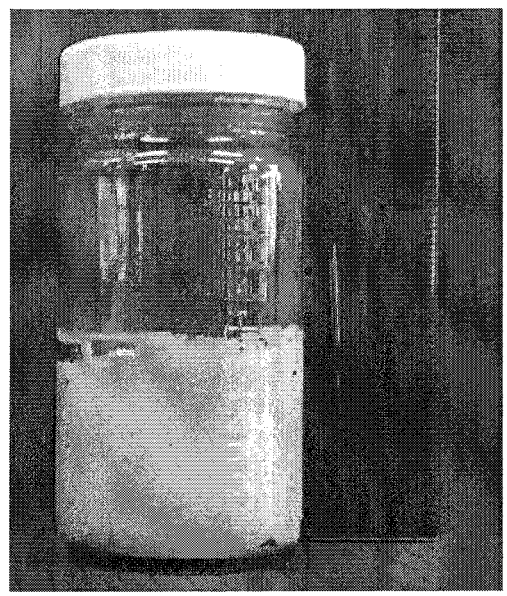
FIGS. 3A-B are photographs of proppant suspensions over time including a dimer acid in the emulsion fluid systems of the disclosure.
Figure 3B:

1. Dimer Acid Emulsion Fluid
   A. Coat 36 g of UNIFRAC™ 20/40 sand with 0.36 ml (1% W/V) Dimer Acid-RS T 80™ additive
   B. Add 4.55 ml ESCAID 110™ oil, 45.45 ml water, and 1 ml EZ MUL NT™
   C. Mix with overhead stirrer
   D. Emulsion formed in 1 minute and 10 seconds.
   E. Temperature=200° F. (93° C.)
   F. Emulsion breaks within 1 hour As seen in FIG. 3A, the emulsion with a dimer acid forms a good emulsion fluid. The photograph in FIG. 3B was taken one hour later and shows, in the beaker on the left, that the emulsion breaks without the need for an internal breaker. The beaker on the right in FIG. 3B contains 36 g of UNIFRAC™ 20/40 sand without any fluids for reference purposes.

2. SANDWEDGE NT™ Conductivity Enhancer
   A. Coat 36 g of UNIFRAC™ 20/40 sand with 0.36 ml (1% W/V) SANDWEDGE NT™ conductivity enhancer
   B. Add 4.55 ml ESCAID 110™ oil, 45.45 ml water, and 1 ml EZ MUL NT™ emulsifier
   C. Mix with overhead stirrer
   D. Emulsion formed in 1 minute and 10 seconds.
   E. Temperature=200° F. (93° C.)
   F. Emulsion did not break in 56 hours.

Figure 4A:
FIGS. 4A-B are photographs of proppant suspensions over time including a traditional tackifying agent in the emulsion fluid systems of the disclosure.
Figure 4B:
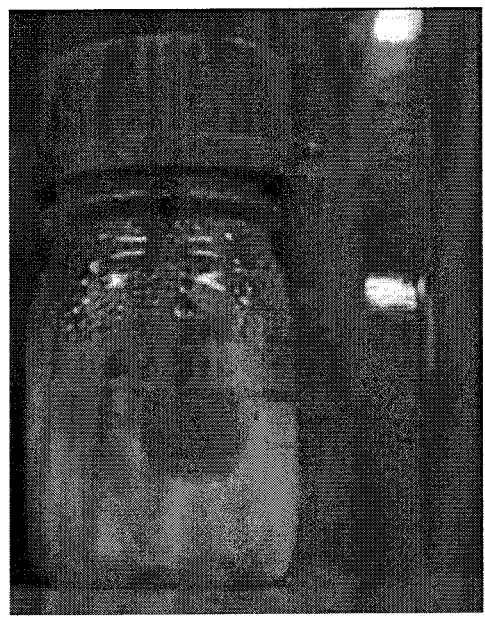

As seen in FIG. 4A, the emulsion with SANDWEDGE NT™ conductivity enhancer forms a good emulsion fluid. The photograph in FIG. 4B was taken 54 hours later and demonstrates that the emulsion does not break without an internal breaker.

One of skill in the art may conclude that emulsion fluids with a dimer acid have at least two advantages over those using traditional tackifying agents. One, the emulsions can break without the use of an internal breaker. Two, the traditional tackifying agents such as SANDWEDGE NT™ conductivity enhancer can be substantially more expensive than dimer acids.

Embodiments disclosed herein include:

A: A method of treating in a subterranean formation comprising: combining a dimer acid; proppant; an emulsifier; an oil base fluid; and aqueous base fluid to form an oil-external emulsified fluid; and introducing the oil-external emulsified fluid into the subterranean formation.

B: A method of forming a wellbore fluid comprising: combining proppant; a dimer acid; an aqueous base fluid, an oil base fluid, and an emulsifier to form a pre-emulsified fluid; and mixing the pre-emulsified fluid to form an oil-external emulsified fluid.

C: A well treatment fluid comprising: an oil-external emulsified fluid comprising: a dimer acid; proppant; an emulsifier; an oil base fluid; and an aqueous base fluid.

D: A well treatment system comprising: a well treatment apparatus, including a mixer and a pump, configured to: combine proppant; a dimer acid; an aqueous base fluid, an oil base fluid, and an emulsifier to form a pre-emulsified fluid; mix the pre-emulsified fluid to form an oil-external emulsified fluid; and introduce the oil-external emulsified fluid into a subterranean formation.

Each of embodiments A, B, C and D may have one or more of the following additional elements in any combination: Element 1: wherein the aqueous base fluid comprises at least one fluid selected from fresh water; saltwater; brine; seawater; and combinations thereof. Element 2: wherein the dimer acid comprises fatty acids with 6 to 18 carbon atoms. Element 3: wherein the fatty acids are the same type of fatty acid. Element 4: wherein the fatty acids are a mixture of two or more different fatty acids. Element 5: wherein the oil-external fluid does not contain a trimer acid. Element 6: wherein the oil base fluid comprises at least one of esters prepared from fatty acids and alcohols; esters prepared from olefins and fatty acids; esters prepared from olefins and alcohols; linear alpha olefins; isomerized olefins having a straight chain; olefins having a branched structure; isomerized olefins having a cyclic structure; olefin hydrocarbons; linear paraffins; branched paraffins; poly-branched paraffins; cyclic paraffins; isoparaffins; mineral oil hydrocarbons; glyceride triesters; naphthenic compounds; diesel; aliphatic ethers prepared from long chain alcohols; aliphatic acetals; dialkylcarbonates; and combinations thereof. Element 7: wherein the proppants are at least one selected from the group consisting of sand; bauxite; ceramic materials; glass materials; polymer materials; nut shell pieces; cured resinous particulates comprising nut shell pieces; seed shell pieces; cured resinous particulates comprising seed shell pieces; fruit pit pieces; cured resinous particulates comprising fruit pit pieces; wood; composite particulates; hydrophobically modified proppants, inherently hydrophobic proppants, proppants with a hydrophobic coating; and any combination thereof. Element 8: wherein the subterranean formation comprises at least one fracture and wherein the introducing further comprises placing at least a portion of the oil-external fluid into the at least one fracture. Element 9: further comprising breaking the introduced emulsion without the use of an internal breaker. Element 10: wherein the oil-external emulsified fluid has an oil-to-water ratio of about 1:99 to about 35:65. Element 11: The method of claim 1, wherein the dimer acid is present in the amount of about 1 gal/1000 gal to about 100 gal/1000 gal of the oil-external emulsified fluid. Element 12: wherein the proppant is coated with the dimer acid to form a coated proppant before combining the resulting coated proppant with the aqueous base fluid, the oil base fluid, and the emulsifier.

The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents, the definitions that are consistent with this specification should be adopted.

Numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. A method of treating in a subterranean formation comprising:
   combining a dimer acid; proppant; an emulsifier; an oil base fluid; and aqueous base fluid to form an oil-external emulsified fluid; and
   introducing the oil-external emulsified fluid into the subterranean formation, wherein the proppant is coated with the dimer acid to form a coated proppant before combining the resulting coated proppant with the aqueous base fluid, the oil base fluid, and the emulsifier.

2. The method of claim 1, wherein the aqueous base fluid comprises at least one fluid selected from fresh water; saltwater; brine; seawater; and combinations thereof.

3. The method of claim 1, wherein the dimer acid comprises fatty acids with 6 to 18 carbon atoms.

4. The method of claim 3, wherein the fatty acids are the same type of fatty acid.

5. The method of claim 3, wherein the fatty acids are a mixture of two or more different fatty acids.

6. The method of claim 1, wherein the oil-external fluid does not contain a trimer acid.

7. The method of claim 1, wherein the oil base fluid comprises at least one of esters prepared from fatty acids and alcohols; esters prepared from olefins and fatty acids; esters prepared from olefins and alcohols; linear alpha olefins; isomerized olefins having a straight chain; olefins having a branched structure; isomerized olefins having a cyclic structure; olefin hydrocarbons; linear paraffins; branched paraffins; poly-branched paraffins; cyclic paraffins; isoparaffins; mineral oil hydrocarbons; glyceride triesters; naphthenic compounds; diesel; aliphatic ethers prepared from long chain alcohols; aliphatic acetals; dialkylcarbonates; and combinations thereof.

8. The method of claim 1, wherein the proppants are at least one selected from the group consisting of sand; bauxite; ceramic materials; glass materials; polymer materials; nut shell pieces; cured resinous particulates comprising nut shell pieces; seed shell pieces; cured resinous particulates comprising seed shell pieces; fruit pit pieces; cured resinous particulates comprising fruit pit pieces; wood; composite particulates; hydrophobically modified proppants, inherently hydrophobic proppants, proppants with a hydrophobic coating; and any combination thereof.

9. The method of claim 1, wherein the subterranean formation comprises at least one fracture and wherein the introducing further comprises placing at least a portion of the oil-external fluid into the at least one fracture.

10. The method of claim 1, further comprising breaking the introduced emulsion without the use of an internal breaker.

11. The method of claim 1, wherein the oil-external emulsified fluid has an oil-to-water ratio of about 1:99 to about 35:65.

12. The method of claim 1, wherein the dimer acid is present in the amount of about 1 gal/1000 gal to about 100 gal/1000 gal of the oil-external emulsified fluid.

13. A method of forming a wellbore fluid comprising:
  combining proppant; a dimer acid; an aqueous base fluid, an oil base fluid, and an emulsifier to form a pre-emulsified fluid; and
  mixing the pre-emulsified fluid to form an oil-external emulsified fluid, wherein the proppant is coated with the dimer acid to form a coated proppant before combining the resulting coated proppant with the aqueous base fluid, the oil base fluid, and the emulsifier.

14. The method of claim 13, wherein the aqueous base fluid comprises at least one fluid selected from fresh water; saltwater; brine; seawater; and combinations thereof.

15. The method of claim 13, wherein the dimer acid comprises fatty acids with 6 to 18 carbon atoms.

16. The method of claim 13, wherein the fatty acids are the same type of fatty acid.

17. The method of claim 16, wherein the fatty acids are a mixture of two or more different fatty acids.

18. The method of claim 13, wherein the oil-external fluid does not contain a trimer acid.

19. The method of claim 13, wherein the oil base fluid comprises at least one of esters prepared from fatty acids and alcohols; esters prepared from olefins and fatty acids; esters prepared from olefins and alcohols; linear alpha olefins; isomerized olefins having a straight chain; olefins having a branched structure; isomerized olefins having a cyclic structure; olefin hydrocarbons; linear paraffins; branched paraffins; poly-branched paraffins; cyclic paraffins; isoparaffins; mineral oil hydrocarbons; glyceride triesters; naphthenic compounds; diesel; aliphatic ethers prepared from long chain alcohols; aliphatic acetals; dialkylcarbonates; and combinations thereof.

20. The method of claim 13, wherein the proppants are at least one selected from the group consisting of sand; bauxite; ceramic materials; glass materials; polymer materials; nut shell pieces; cured resinous particulates comprising nut shell pieces; seed shell pieces; cured resinous particulates comprising seed shell pieces; fruit pit pieces; cured resinous particulates comprising fruit pit pieces; wood; composite particulates; hydrophobically modified proppants, inherently hydrophobic proppants, proppants with a hydrophobic coating; and any combination thereof.

21. A method of treating in a subterranean formation comprising:
  providing a coated proppant, wherein the coated proppant comprises a proppant coated with a dimer acid;
  combining the coated acid; an emulsifier; an oil base fluid; and aqueous base fluid to form an oil-external emulsified fluid; and
  introducing the oil-external emulsified fluid into the subterranean formation.

* * * * *